L. MICHAELS.
AUTOMOBILE STARTING CRANK.
APPLICATION FILED JUNE 15, 1910.
984,014.
Patented Feb. 14, 1911.
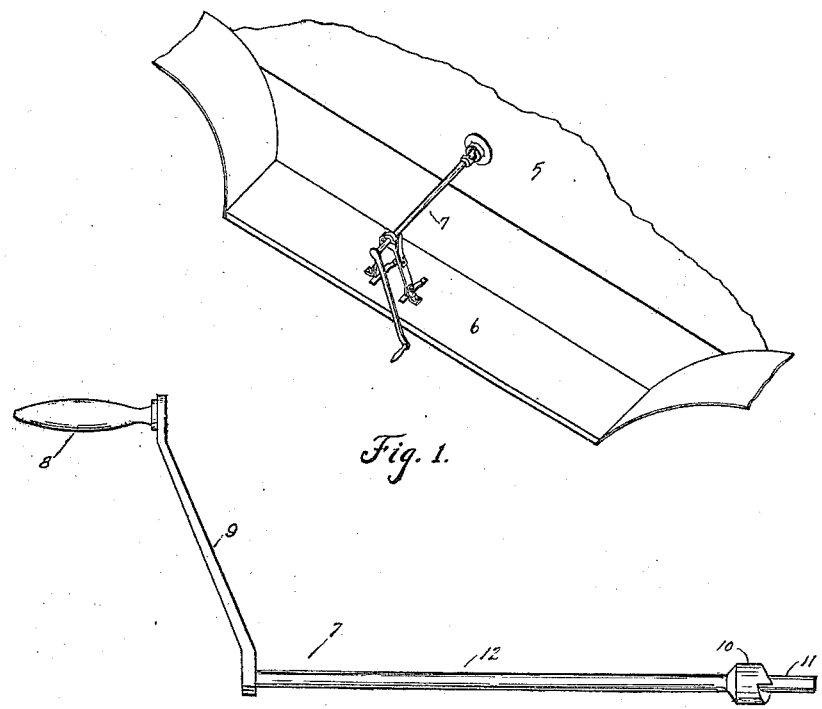
Fig. 1.
Fig. 2.
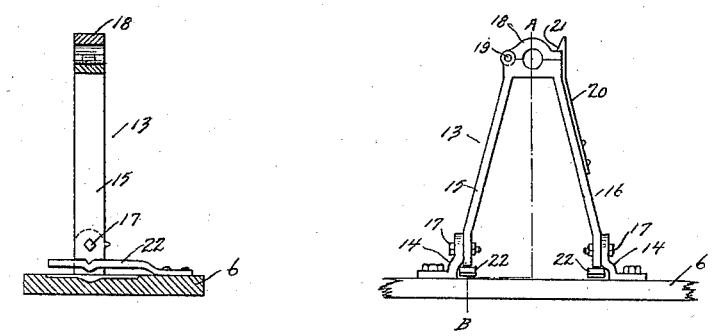
Fig. 4.
Fig. 3.
WITNESSES:
INVENTOR
Levin Michaels
BY
J. W. Ellis
ATTORNEY.

UNITED STATES PATENT OFFICE.

LEVIN MICHAELS, OF BUFFALO, NEW YORK.

AUTOMOBILE STARTING-CRANK.

984,014.  Specification of Letters Patent.  Patented Feb. 14, 1911.

Application filed June 15, 1910. Serial No. 566,953.

*To all whom it may concern:*

Be it known that I, LEVIN MICHAELS, a citizen of the United States of America, residing at Buffalo, in the county of Erie and State of New York, have invented certain new and useful Improvements in Automobile Starting-Cranks.

My invention relates to starting cranks for automobiles, and more particularly those automobiles which are started from the side of the body. As is well known, in this type of automobile a short-armed starting crank is employed which must be revolved between the side of the car and the side step. This makes the operation of the crank exceedingly difficult and in fact dangerous to the operator and, because of the inability to properly get at the crank when cranking the machine, and the strained position necessary when operating the same, the operator often becomes fatigued and unable to start the machine.

My invention provides means whereby the above objections are overcome and by which the above named type of cars may be easily and conveniently started.

Reference is to be had to the accompanying drawings forming part of this specification, in which like characters of reference indicate corresponding parts in the different views.

In the drawings: Figure 1 is a perspective view of my device attached to an automobile and in a position ready to be used. Fig. 2 is a view of the starting crank. Fig. 3 is a front view of the crank standard. Fig. 4 is a sectional view of the crank standard taken on the line A—B of Fig. 3.

5 represents a portion of the starting side of an automobile body, that portion through which the clutch-member end of the engine crank-shaft projects, and 6 represents the side step of the auto to which I secure a part of my device.

7 is the crank which is provided in the ordinary manner with the handle 8, arm 9, clutch member 10 and shaft extension 11. The shaft 12 is made sufficiently long so that the crank arm will swing clear of the outer edge of the side step 6.

13 is the crank supporting standard, which is foldably mounted upon the side step 6 by means of the brackets 14. The standard 13 has legs 15 and 16 the lower ends of which are rotatably secured to the brackets 14 by means of the bolts 17. The upper end of the standard 13 is provided with a cap 18 which is hinged at one side of the standard by means of the hinge-pin 19. The said cap and standard are bored out so as to provide a bearing for the starting crank when it is placed therein. So as to be able to quickly lock the cap 18 in place and to quickly and easily unlock the same, I provide a spring 20, which is secured to the leg 16 at some distance below the cap as shown in Fig. 3. The spring at its upper end is provided with a notch 21 which fits over the outer edge of the cap 18 when the same is in its closed position and forms a simple and effective fastener for the same.

Secured to the step 6 and disposed directly beneath the lower ends of the legs 15 and 16 of the standard are springs 22. These springs may be provided with grooves or indentations and the lower ends and sides of the legs 15 and 16 with lugs fitting into said grooves or indentations as a means for rigidly holding the standard in its upright and folded position and obviously any other suitable means may be employed for accomplishing this end or if desired, the standard may be rigidly secured to the side step of the automobile without departing from the spirit of my invention.

When it is desired to use my device the standard is raised to its upright position, as it is shown in the drawings, and the upper end of the spring is pressed back with the finger or thumb and the cap 18 is opened. The end 11 of the crank is now inserted into the engine crank-shaft clutch member and the shaft 12 laid in the bearing in the standard, whereupon the cap 18 is pressed down upon the shaft and is securely locked in place by the spring 20. Thus it will be seen that the length of the arm 9 of the starting crank may be made any desired length and that the same may be revolved with great ease, as there is nothing to make the crank difficult of access as is the case with the present style of starting crank as hereinbefore pointed out.

When the engine has been started the crank is preferably grasped in the right hand and while giving the same a slight upward pressure, the spring 20 is pressed back with the thumb, whereupon the starting crank may be removed after which the standard may be folded down and out of the way upon the step 6.

Obviously some modifications of the details of my invention may be made without departing from the spirit of my invention and I do not wish to be limited to the exact embodiment herein shown and described.

Having described my invention what I claim is:

1. The combination with an automobile, its engine crank-shaft and side step; of an extended starting crank and a supporting standard secured to said side step in line with said crank-shaft and provided with a cap hinged to said standard and a cap spring, said spring being secured to the side of said standard, whereby the said cap may be securely held in place when the said starting crank is being operated and quickly released when desired.

2. The combination with an automobile, its engine crank-shaft and side step; of an extended starting crank, brackets secured to said side step, a supporting standard rotatably secured at its lower ends to said brackets, a cap rotatably mounted to the upper end of said standard, a spring secured to said standard engageable with said cap and means for holding said standard in its upright or in its folded position, whereby the arm of said starting crank may be brought out beyond the outside of said step and the crank detachably held in position by said standard.

3. The combination with an automobile, its engine crank-shaft and side step; of an extended starting crank, brackets secured to said side step, a supporting standard rotatably secured at its lower ends to said brackets, a cap rotatably mounted to the upper end of said standard, a spring secured to said standard engageable with said cap and springs secured to said side step, so disposed as to bear against the bottoms of the lower ends of said standard when said standard is in its upright position and against the sides of said lower ends when the standard is in its folded position, whereby the arm of said starting crank may be brought out beyond the outside of said step and the crank detachably held in position by said standard.

4. The combination with an automobile, its engine crank-shaft and side step; of an extended starting crank, brackets secured to said side step, a supporting standard rotatably secured at its lower ends to said brackets, a cap rotatably mounted to the upper end of said standard, a spring secured to said standard engageable with said cap, lugs provided on the bottoms and sides of the lower ends of said standard, and springs secured to said side step and each provided with a groove each engageable with one of said lugs when the said standard is in its upright position and engageable with the other of said lugs when said standard is folded, whereby the arm of said starting crank may be brought out beyond the outside of said step and the crank detachably held in position by said standard.

In testimony whereof, I have hereunto set my hand in the presence of two witnesses.

LEVIN MICHAELS.

Witnesses:
   HENRY MICHAELS,
   J. WM. ELLIS.